(12) United States Patent
Davis et al.

(10) Patent No.: US 12,273,568 B2
(45) Date of Patent: Apr. 8, 2025

(54) SOCIAL VIDEO PLATFORM FOR GENERATING AND EXPERIENCING CONTENT

(71) Applicant: WARNER BROS. ENTERTAINMENT INC., Burbank, CA (US)

(72) Inventors: Matthew Gordon Davis, New York City, NY (US); Jesse I. Redniss, Westport, CT (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 17/460,159

(22) Filed: Aug. 27, 2021

(65) Prior Publication Data
US 2022/0070501 A1 Mar. 3, 2022

Related U.S. Application Data

(60) Provisional application No. 63/071,089, filed on Aug. 27, 2020.

(51) Int. Cl.
*H04N 21/2187* (2011.01)
*H04N 21/234* (2011.01)
*H04N 21/854* (2011.01)

(52) U.S. Cl.
CPC ... *H04N 21/2187* (2013.01); *H04N 21/23418* (2013.01); *H04N 21/854* (2013.01)

(58) Field of Classification Search
CPC ......... H04N 21/2187; H04N 21/23418; H04N 21/854
See application file for complete search history.

(56) References Cited

U.S. PATENT DOCUMENTS

| | | | |
|---|---|---|---|
| 10,721,499 B2 * | 7/2020 | Chang | H04N 21/21805 |
| 2006/0104600 A1 * | 5/2006 | Abrams | H04N 21/21805 386/230 |
| 2009/0099836 A1 * | 4/2009 | Jacobsen | G06F 40/58 704/E15.001 |
| 2016/0023116 A1 * | 1/2016 | Wire | A63F 13/71 463/16 |
| 2020/0321030 A1 * | 10/2020 | Kellicker | H04N 21/2187 |
| 2020/0344278 A1 * | 10/2020 | Mackell | H04L 65/1083 |
| 2020/0349610 A1 * | 11/2020 | Publicover | H04N 21/4858 |
| 2021/0227276 A1 * | 7/2021 | Mayol Cuevas | G06V 20/41 |

* cited by examiner

Primary Examiner — Thai Q Tran
Assistant Examiner — Jose M Mesa
(74) Attorney, Agent, or Firm — Bookoff McAndrews, PLLC (57) ABSTRACT

Systems and methods described herein are configured to enhance the understanding and experience of news and live events in real-time. The systems and methods leverage a distributed network of professional and amateur journalists/correspondents using technology to create unique experiences and/or provide views and perspectives different from experiences, views and/or perspectives provided by existing newscasts and/or sportscasts.

20 Claims, 5 Drawing Sheets

SOCIAL VIDEO PLATFORM FOR GENERATING AND EXPERIENCING CONTENT

PRIORITY CLAIM

The present application claims priority to U.S. provisional patent application Ser. No. 63/071,089 filed Aug. 27, 2020, which is incorporated herein in its entirety by reference.

FIELD

The present application relates to methods and elements of novel online social video platforms for generating and experiencing electronic video, audio or textual content.

BACKGROUND

Currently it is difficult for users to collaborate on producing video based on newscasts or other forms of live events.

It would be desirable, therefore, to develop new methods and other new technologies for social video platforms, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a method for automatically producing live video content received from one or more collaborators, may include receiving, by at least one processor, input video from one or more user devices;

processing, by the at least one processor, the input video using object recognition and scene detection algorithms that tag and organize recognized scenes and objects;

generating, by the at least one processor, a sequence of video clips based on the processing; and sending, by the at least one processor, the sequence of video clips to at least one client device.

As used herein, a "client device" includes at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Implementations described herein are configured for developing a novel social video platform to enhance how people understand and experience news and live events in real-time through a verified, technology-enabled networks of correspondents and AI-assisted virtual studio. Various systems and methods described herein leverage advancements in 5G technology, artificial intelligence (AI) technology, image capture and display technology, social and video technology, and other technology areas to develop new ways to gather, produce and experience news, sports, and live entertainment content.

Figure 1:
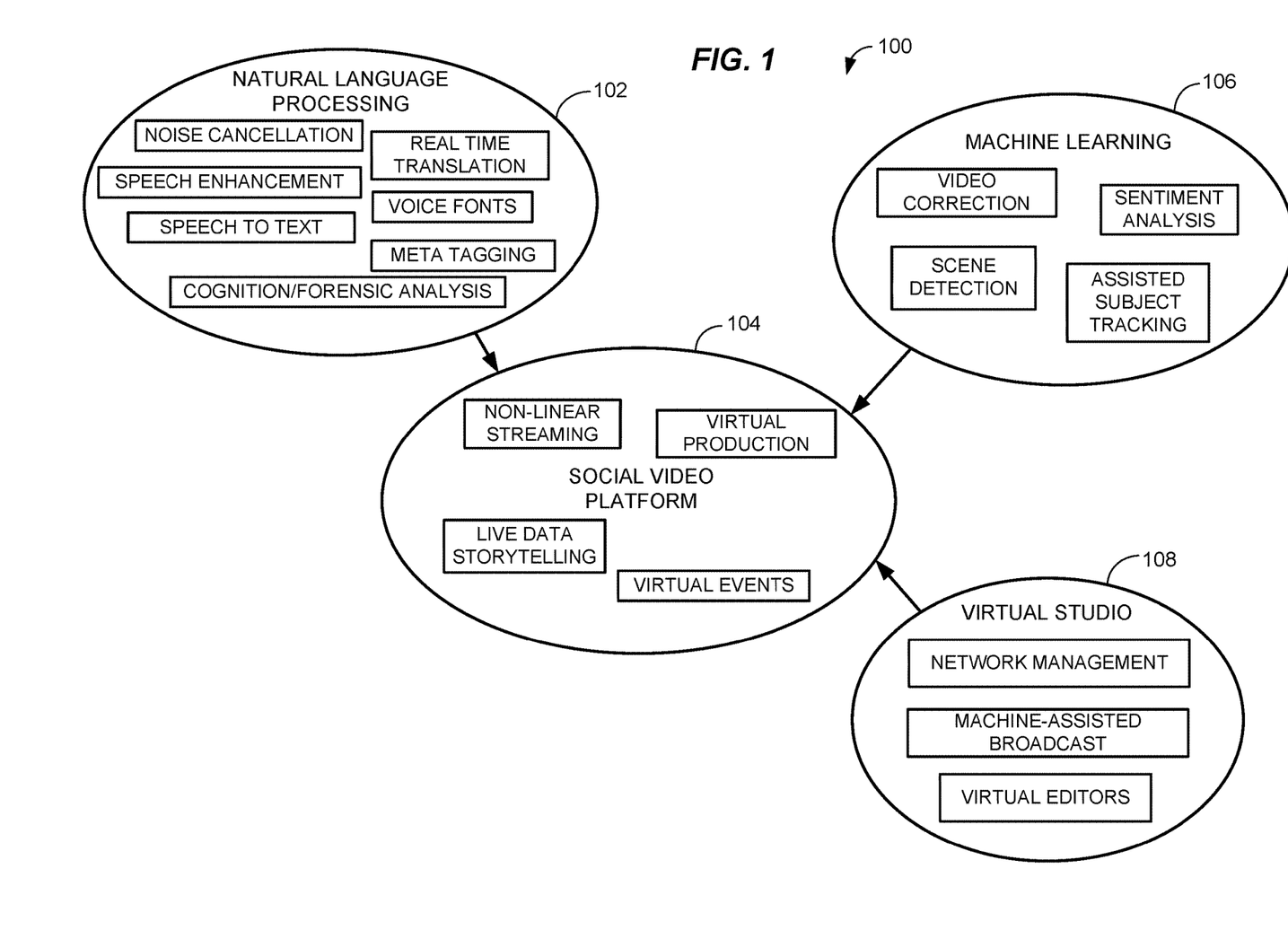
FIG. 1 is a schematic diagram illustrating functions and capabilities of a novel social video platform.

The novel social video platform can be adapted to provide different functions, such as, for example, to enable generation and production of content from sources that are distributed in different geographical locations or regions. The novel social video platform can use natural language processing (NLP) techniques, machine learning (ML) and virtual studio techniques to generate/produce content from sources that are distributed in different geographical locations or regions. FIG. 1 shows some of the functionalities/capabilities 100 of the novel social video platform and the different natural language processing techniques, machine learning and virtual studio techniques that can be relied upon to generate/produce content from sources that are distributed in different geographical locations or regions. Functional classes may include, for example, natural language processing 102, the social video platform 104, machine learning and artificial intelligence (AI) 106 and a virtual studio 108. The social medial platform 104 is supported by and integrates functions from the various classes 102, 106, 108.

In addition to the technological developments in machine learning, natural language processing and virtual studio, the novel social video platform can leverage the growth in high-speed and low latency 5G networks, increased processing power in edge networks, advances in smart phone technology and cloud computing to engage with audiences and provide new viewing experiences.

For example, the novel social video platform can provide non-linear and personalized ways of experiencing content by (i) using advances in camera technology and artificial intelligence to augment, assist and contextualize events as they happen; (ii) organizing, arranging and analyzing pictures, videos and social media feeds of events in real-time using artificial intelligence/cloud computing; and/or (iii) organize reactions and information from contributors/citizen journalists.

Figure 2:
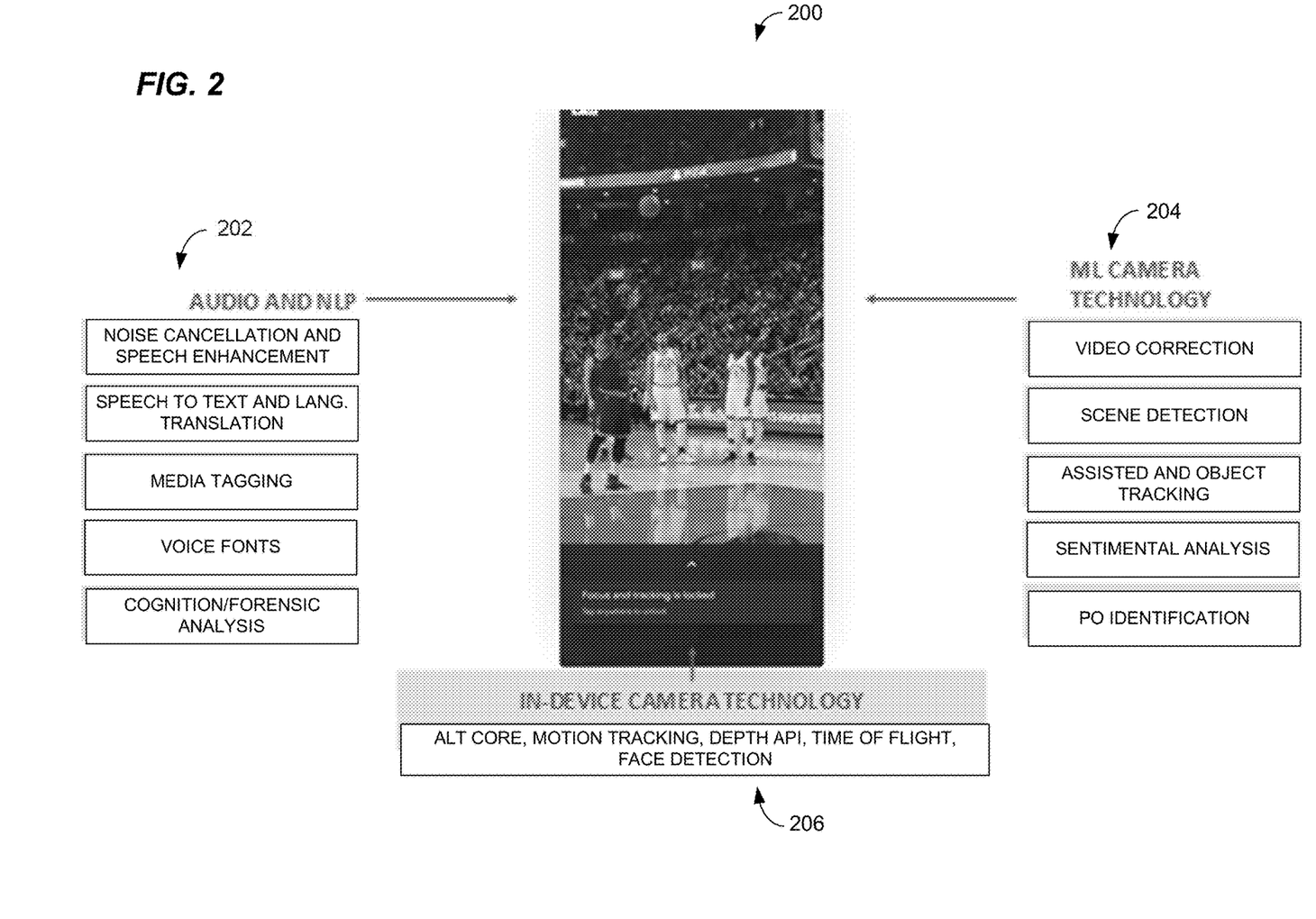
FIG. 2 is an augmented screenshot illustrating an example of the novel social video platform providing a personal viewing experience for a broadcast of a sporting event.

FIG. 2 shows an example of how the various technologies discussed above can provide a personalized viewing experience. One or more viewers watching a basket-ball game in person can leverage advances in connected camera devices (e.g., smart phones, ARNR devices, etc.) to capture a photograph or a video 200 of exciting moments of the game from their viewpoint, augment/enhance/refine the captured photograph/video using NLP/ML/AI 202, 204, and share the captured photograph/video with other people in real-time or at a later time.

In the example illustrated above in FIG. 2, NLP and/or audio processing techniques 202 can be used to clarify the dialogue between the players, translate or caption the speech using speech to text and live translation, capture metadata for tagging purposes, generating voice fonts and/or for cognition/forensic analysis. AI/ML techniques 204 can be used for scene detection, video correction, assisted subject tracking, sentiment analysis and/or place or person of interest identification. In-device camera technology can be used to rely on face detection technology to identify players, use augmented reality applications to virtually display player stats or other information over features of the photograph/video, generate 3D views, automatically adjust focus and track the players, etc. The combination of AI/ML and in-device camera features can also be used to identify the stadium/location where the game is being played and provide information associated with the stadium/location. The augmented/enhanced photograph/video can be shared by the viewer over their social media feed. In some implementations, the augmented/enhanced photograph/video can be uploaded to an application for streaming/broadcasting to subscribers of a streaming service and/or made available for viewing by the general public. The techniques 202, 204 may be executed by software on the user's smart phone or the like, alone or in combination with processing by a remote server.

In various implementations, the social video platform can be configured to receive photographs/videos from viewers viewing the same event from different vantage points. The photographs/videos received from the different viewers can be used to generate a video segment that shows different views of the same event. The generated video segment can be uploaded to an application for streaming/broadcasting to subscribers of a streaming service and/or made available for viewing by the general public. In some implementations, the received photographs/videos from viewers viewing the same event from different vantage points can be analyzed to determine locations that have better views of the event. The analysis can be performed in real-time or near real-time, such as, for example in less than 30 seconds. Photographs/video segments from viewers viewing the event from locations have better views of the event can be presented to viewers viewing the event from locations having poor views of the event. In some implementations, the viewers viewing the event may be directed to locations offering better views of the event.

In various implementations, the social video platform can be configured to analyze the photographs/videos received from one or more viewers using various tools (e.g., object recognition, facial recognition tools, sentiment analysis, speech analysis, etc.). Based on the analysis, the social video platform can be configured to obtain a context of what's happening in the scene captured by the photographs/videos. The analysis can be performed in real-time or near real-time, such as, for example in less than 30 seconds. In some implementations, the social video platform can be configured to utilize tools (e.g., position and footage recognition tools) to select one or more photographs/videos depicting a scene from a plurality of photographs/videos depicting the same scene. For example, the social video platform can be configured to identify duplicate or nearly duplicate photographs/videos of a scene. The selection/identification can be performed in real-time or near real-time, such as, for example in less than 30 seconds. As discussed above, the social video platform can be configured to utilize tools (e.g., object recognition/facial recognition) to identify people, objects, landmarks, etc. in the scene captured by the photographs/videos and provide relevant data to users (e.g., viewers, correspondents, journalists) of the social video platform. The identification can be performed in real-time or near real-time, such as, for example in less than 30 seconds. The relevant data can include statistics, information from social media, websites, or other Internet sources. The relevant data can be overlaid over the objects, people, landmarks in the scene using augmented reality (AR) tools. In various implementations, the social video platform can be configured to analyze the photographs/videos received from one or more viewers using various tools (e.g., object recognition/facial recognition) to blur out or obscure unauthorized branding information, sensitive content or inappropriate messages/gestures. The analysis can be performed in real-time or near real-time, such as, for example in less than 30 seconds.

In various implementations, the social video platform can be configured to analyze audio captured during live filming of an event/interview using NLP tools. The analysis of the audio can occur in real-time or near real-time (e.g., in a time frame less than 30 seconds). Based on the analysis, the captured audio can be turned to text and/or translated in real-time/near real-time. In various implementations, the analysis of the captured audio can include sentiment analysis to understand a context of the words spoken. In some implementations, the analysis of the captured audio can provide live fact checking which can be communicated to the journalist/news correspondent in real-time or near real-time.

The social video platform can be configured as an application that runs on a multimedia computing device under the control of a hardware electronic processor. The multimedia computing device can comprise a camera that is under the control of the hardware electronic processor, a microphone that is under the control of the hardware processor, a speaker that is under the control of the hardware electronic processor, and a display that is under the control of the hardware electronic processor. The multimedia computing device can be a smart phone (e.g., an iPhone or an Android phone), a tablet computer, a laptop/desktop. The application is generally referred to herein as a collaborator app. The collaborator app can be downloaded from an application store and installed on the multimedia device by users. The users can be news correspondents, citizen journalists, student journalists or subscribers of the collaborator app. The users can access the collaborator app via unique user name and password. The collaborator app can be configured to, under the control of the hardware electronic processor, access the camera, the speaker, the microphone and the display of the multimedia computing device when used by the user. The collaborator app may also be configured to provide notification to the user when it is being used.

Figure 3:
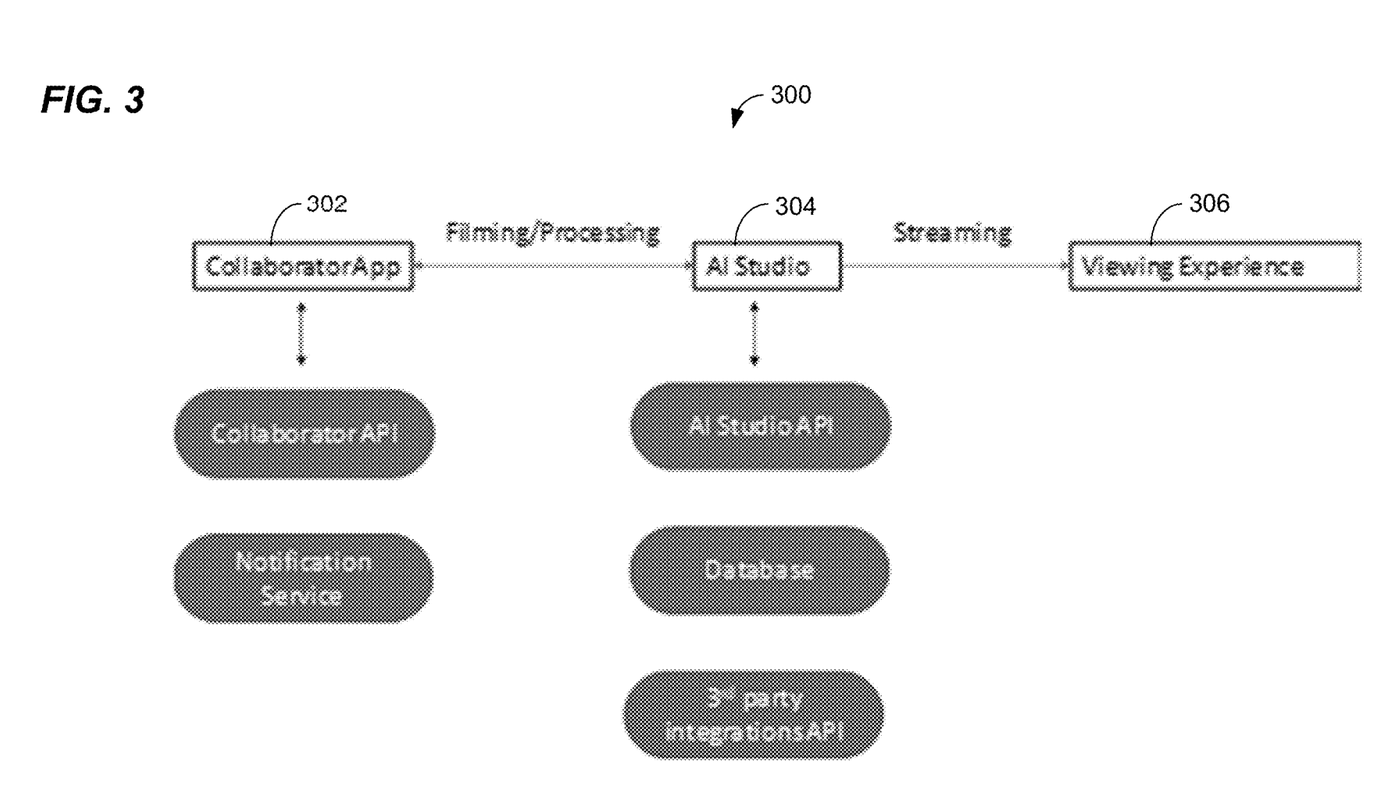
FIG. 3 is a block diagram illustrating aspects of an implementation of a collaborator application for use with the novel social video platform.

The user can capture videos/photographs of a scene using the collaborator app. The collaborator app can be integrated with natural language processing tools, machine learning tools, virtual studio tools to provide one or more functionalities/capabilities discussed above. Without any loss of generality, the natural language processing tools, machine learning tools, virtual studio tools can be collectively referred to as AI (artificial intelligence) studio tools. In some implementations, the collaborator app can be configured to interface with third party applications/tools that can provide natural language processing capabilities, machine learning capabilities, AI/virtual studio capabilities. Using the integrated tools and/or the third party applications/tools, the collaborator can analyze/process the captured videos/photographs as discussed above. The processed videos/photographs can be uploaded to a cloud network by the collaborator app. In some implementations, the videos/photographs can be broadcast/streamed or made available to the user to share. FIG. 3 shows an implementation 300 of the collaborator application 302 in conjunction with an AI Studio that receives content from the collaborator 302 and streams it to one or more destinations for a user's viewing experience 306.

Figure 4:
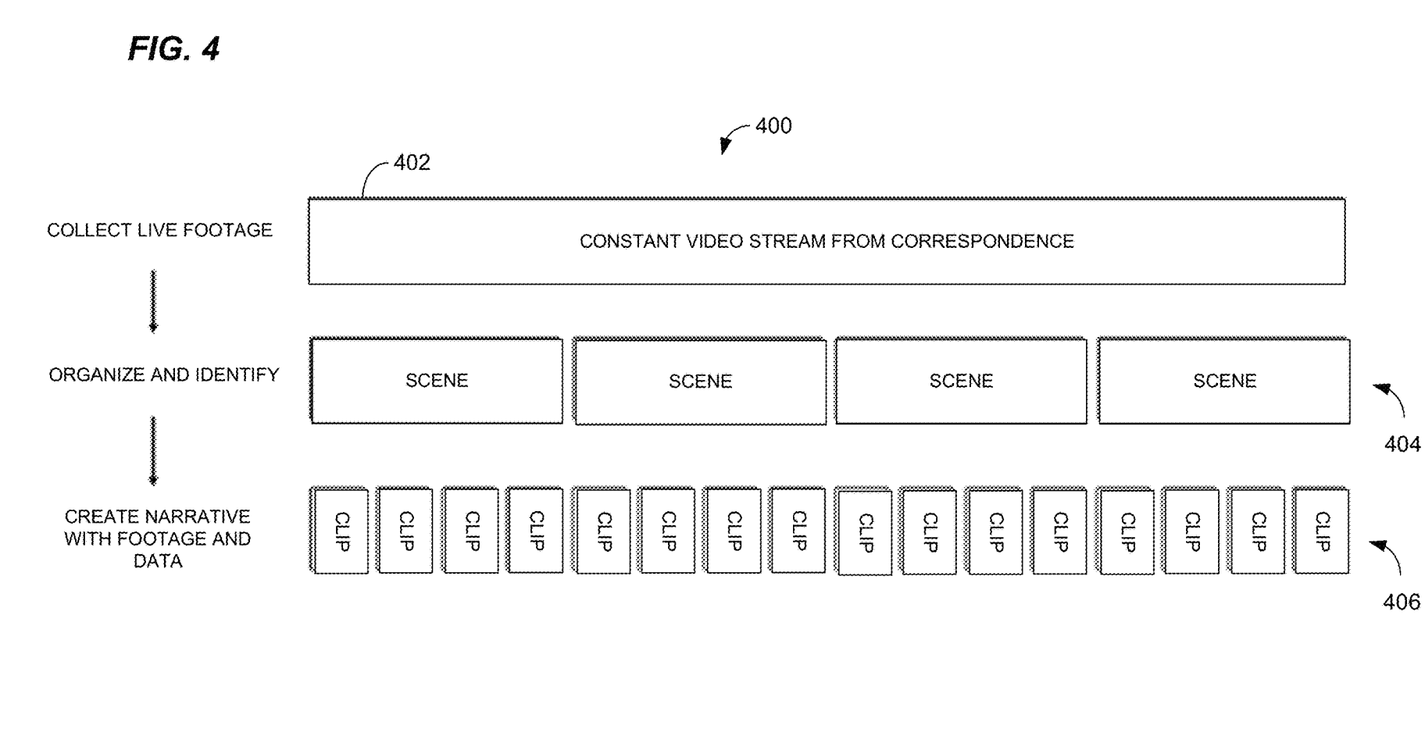
FIG. 4 is a block diagram illustrating aspects of an algorithm to verify, tag and/or categorize footage for the novel social video platform.

The collaborator application 302 may be configured to contextualize, arrange and analyze footage in real-time using cloud or blockchain-based applications in communication with the user's smart phone or the like. The collaborator application may be configured to verify, tag and/or categorize/organize footage while filming video segments (e.g., news/sports video segments). FIG. 4 shows an implementation 400 of a collaborator application to verify, tag and/or categorize/organize footage 402 based using object recognition and/or scene 404 detection tools. With reference to FIG. 4, the collaborator app can collect live footage 402 filmed by one or more users (e.g., news correspondent, journalists, users). The live footage can be in the form of a constant video stream 402. The collected live footage can be stabilized using machine learning algorithms. The collected live footage can be from a single user or multiple users with different vantage points. Object recognition and scene detection algorithms can be used to detect scenes 404 from the collected footage. The detected scenes can be tagged and organized according to the features detected in the scene. A narrative including a plurality of clips 406 can be created by combining the tagged and organized scenes along with data (e.g., statistics, location information, social media information, speech to text conversion, translation, blurring of unauthorized branding/inappropriate gestures/inappropriate messages). The clips can be streamed or broadcast to one or more client devices for viewing by users.

The collaborator app can be configured to organize users and manage a network of users. As discussed above, notifications can be provided to the users. The notifications can include breaking news events occurring locally or globally. The notification can include interesting local events that are happening in the vicinity of the user (e.g., movie premieres, sporting events, concerts, etc.). The collaborator app can also provide a social platform to the users to interact with each other individually or as a community. The collaborator app can interface with other applications (e.g., social media applications, map applications, voice recording applications, news applications, etc.) on the multimedia device.

Figure 5A:
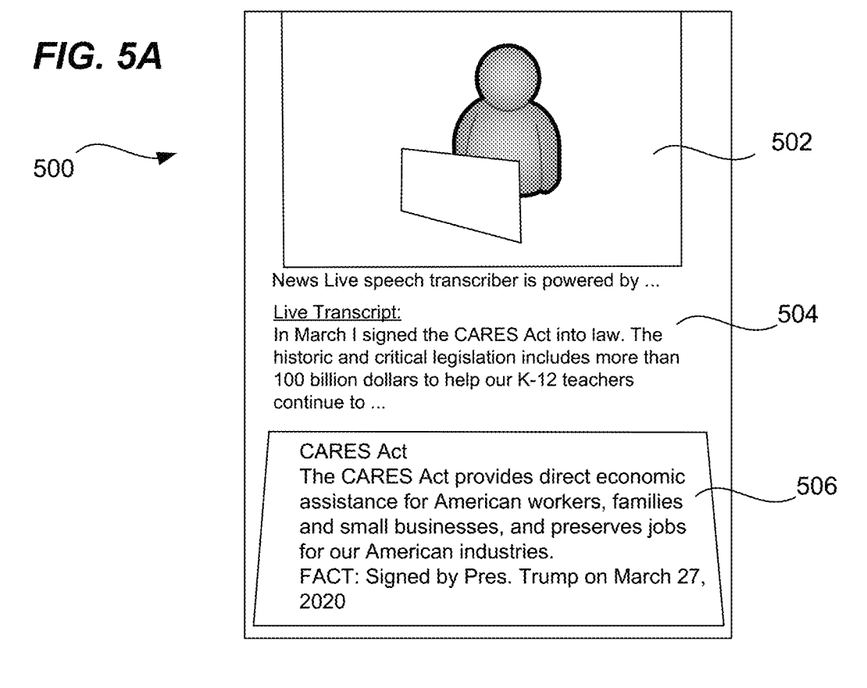
FIGS. 5A and 5B are screenshots illustrating an output of an AI powered news analysis.
Figure 5B:
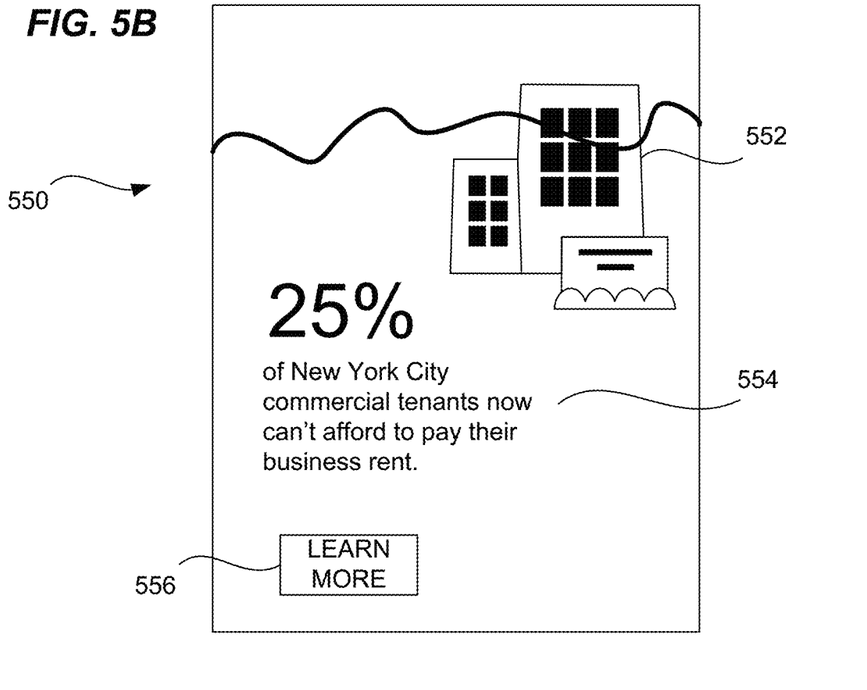

Artificial Intelligence Based News Forensics: This application also contemplates an AI powered news forensic system that is configured to augment live news broadcasts on major news networks with AI tools. For example, during a live news broadcast, the AI powered news forensic system can be configured to analyze speech and scenes from the live broadcast using AI tools (e.g., NLP tools, ML tools, computer vision tools, deep learning methods, scene analysis, etc.) and display information relevant to the news item being presented. The relevant information can be displayed on a side of the panel including the live news broadcast or below the panel including the live news broadcast. The displayed relevant information can be augment/supplement the news broadcast. The displayed relevant information can include modular, live data visualizations supporting or contradicting statements, or references as text and images with their sources allowing users to deep dive on a subject, understand the origins of claim, or recognize bias. FIGS. 5A and 5B below show examples of this concept.

In FIG. 5A, showing a simplified screen display 500, AI tools are used to provide a live transcript 504 of the news broadcast video 502 along with fact checking information 506 and other details that are relevant to the news being presented. In FIG. 5B, showing a simplified screen display 550, AI tools are used to provide a live data visualization 552 relevant to the news item being presented 554. In addition to the facts or relevant data being presented, the viewer/news consumer can be presented with an option 556 to explore statistics, historical facts, background information relevant to the news item being presented. In some implementations, the AI powered news forensic system can provide links to relevant information on 3rd party external websites (e.g., google.com, Wikipedia.com, etc.) to allow the viewer/news consumer to go deeper in the news item. In some implementations, the AI powered news forensic system can show clips of previous news broadcasts related to the news item being presented. The AI powered news forensic system can be configured to augment the news broadcast in sufficiently real time (e.g., less than 30 seconds).

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C#, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for automatically producing live video content received from one or more collaborators, the method comprising:

receiving, by at least one processor, disparate live input video streams from multiple user devices associated with different user accounts, the disparate live input video streams providing different views of an event occurring at a definite place and time, wherein the disparate live input video streams include a plurality of video frames or a plurality of videos;

analyzing, by the at least one processor, the disparate live input video streams to obtain a context of the plurality of video frames or the plurality of videos;

processing, by the at least one processor, the disparate live input video streams based on the context, the processing including using at least one of artificial intelligence (AI), machine learning (ML), and natural language processing (NLP) for selecting a plurality of scenes from the disparate live input video streams to include in a sequence of video clips to be generated from at least two user devices of the multiple user devices;

obscuring, by the at least one processor, content included in the at least one of the plurality of selected scenes, wherein the obscured content includes at least one of: unauthorized branding information, at least one inappropriate message, and at least one inappropriate gesture;

generating, by the at least one processor, the sequence of video clips from the disparate live input video streams, wherein the sequence of video clips includes the obscured content that includes at least one of: unauthorized branding information, the obscured at least one inappropriate message, and the obscured at least one inappropriate gesture, based on the processing and the obscuring of the at least one of the plurality of selected scenes from the disparate live input video streams; and sending, by the at least one processor, the sequence of video clips to at least one client device.

2. The method of claim 1, further comprising receiving user-provided data regarding the disparate live input video streams, in conjunction with the receiving.

3. The method of claim 2, wherein the processing further comprises generating additional information regarding the scenes selected by the processing.

4. The method of claim 3, further comprising including at least one of the user-provided data or the additional information in the sequence of video clips.

5. The method of claim 2, wherein the user-provided data includes one or more of location or social media information.

6. The method of claim 3, wherein the additional information generated by the processing includes one or more of statistics, speech to text conversion, translation, or information relevant to a news item being presented in the sequence of video clips.

7. An apparatus for automatically producing live video content received from one or more collaborators, comprising a processor coupled the a memory and to a video output, the memory holding instructions that when executed by the processor cause the apparatus to perform:

receiving, by at least one processor, disparate live input video streams from multiple user devices associated with different user accounts, the disparate live input video streams providing different views of an event occurring at a definite place and time, wherein the disparate live input video streams include a plurality of video frames or a plurality of videos;

analyzing, by the at least one processor, the disparate live input video streams to obtain a context of the plurality of video frames or the plurality of videos;

processing, by the at least one processor, the disparate live input video streams based on the context, the processing including using at least one of artificial intelligence (AI), machine learning (ML), and natural language processing (NLP) for selecting a plurality of scenes from the disparate live input video streams to include in a sequence of video clips to be generated from at least two user devices of the multiple user devices;

obscuring, by the at least one processor, content included in the at least one of the plurality of selected scenes, wherein the obscured content includes at least one of: unauthorized branding information, at least one inappropriate message, and at least one inappropriate gesture;

generating, by the at least one processor, the sequence of video clips from the disparate live input video streams, wherein the sequence of video clips includes the obscured content that includes at least one of: unauthorized branding information, the obscured at least one inappropriate message, and the obscured at least one inappropriate gesture, based on the processing and the obscuring of the at least one of the plurality of selected scenes from the disparate live input video streams; and sending, by the at least one processor, the sequence of video clips to at least one client device.

8. The apparatus of claim 7, wherein the memory holds further instructions for receiving user-provided data regarding the disparate live input video streams, in conjunction with the receiving.

9. The apparatus of claim 8, wherein the memory holds further instructions for the processing further comprising generating additional information regarding the scenes selected by the processing.

10. The apparatus of claim 9, wherein the memory holds further instructions for including at least one of the user-provided data or the additional information in the sequence of video clips.

11. The apparatus of claim 8, wherein the user-provided data includes one or more of location or social media information.

12. The apparatus of claim 9, wherein the additional information generated by the processing includes one or more of statistics, speech to text conversion, translation, or information relevant to a news item being presented in the sequence of video clips.

13. The method of claim 1, wherein the processing further comprises processing the disparate live input video streams using object recognition and scene detection algorithms that tag and organize recognized scenes and objects.

14. The method of claim 1, wherein the processing further comprises analyzing a vantage point of the disparate live input video streams from each of the input devices.

15. The method of claim 14, wherein the processing further comprises selecting a portion of the disparate live input video streams from ones of the input video streams determined by the analyzing to have better views of the event.

16. The method of claim 1, wherein the sequence of video clips includes selected portion of the disparate live input video streams, and further comprising sending the sequence of video clips to one or more of user devices providing video having a poor view of the event.

17. The method of claim 1, wherein the processing further comprises enhancing the disparate live input video streams by automatically adjusting focus on a selected person.

18. The method of claim 1, wherein the processing further comprises enhancing the disparate live input video streams by automatically tracking movement of a selected person.

19. The method of claim 1, wherein the processing further comprises augmenting the disparate live input video streams by generating captions for audible speech.

20. The method of claim 1, wherein the processing further comprises augmenting the disparate live input video streams by translating audible speech.

* * * * *

UNITED STATES PATENT AND TRADEMARK OFFICE
CERTIFICATE OF CORRECTION

| | |
|---|---|
| PATENT NO. | : 12,273,568 B2 |
| APPLICATION NO. | : 17/460159 |
| DATED | : April 8, 2025 |
| INVENTOR(S) | : Matthew Gordon Davis and Jesse I. Redniss |

Page 1 of 1

It is certified that error appears in the above-identified patent and that said Letters Patent is hereby corrected as shown below:

In the Claims

In Column 9, Line 29, delete "processor coupled the a memory" and insert --processor coupled to a memory--

Signed and Sealed this
Thirteenth Day of May, 2025

Coke Morgan Stewart
*Acting Director of the United States Patent and Trademark Office*